United States Patent
Wechsler

(10) Patent No.: US 7,788,288 B1
(45) Date of Patent: Aug. 31, 2010

(54) METHOD FOR DISTRIBUTED CONFIGURATION AND FILE DISTRIBUTION BASED ON CENTRALIZED DATA

(75) Inventor: Chesla C. Wechsler, Shrewsbury, NJ (US)

(73) Assignee: AT&T Corp., New York, NY (US)

( * ) Notice: Subject to any disclaimer, the term of this patent is extended or adjusted under 35 U.S.C. 154(b) by 383 days.

(21) Appl. No.: 11/214,103

(22) Filed: Aug. 29, 2005

Related U.S. Application Data

(60) Provisional application No. 60/623,897, filed on Nov. 1, 2004.

(51) Int. Cl.
*G06F 7/00* (2006.01)
*G06F 17/30* (2006.01)

(52) U.S. Cl. .................... 707/803; 707/812

(58) Field of Classification Search .......... 707/1–10, 707/100–104.1, 200–206; 709/217, 219; 370/395.4, 432
See application file for complete search history.

(56) References Cited

U.S. PATENT DOCUMENTS

| | | | |
|---|---|---|---|
| 6,029,196 A * | 2/2000 | Lenz | 709/221 |
| 6,104,803 A | 8/2000 | Weser et al. | |
| 6,237,092 B1 * | 5/2001 | Hayes, Jr. | 713/100 |
| 6,240,413 B1 | 5/2001 | Learmont | |
| 6,493,721 B1 | 12/2002 | Getchius et al. | |
| 6,598,037 B1 * | 7/2003 | Craig et al. | 707/1 |
| 6,917,625 B1 * | 7/2005 | Brush et al. | 370/437 |
| 6,944,636 B1 * | 9/2005 | Starbuck | 707/203 |

OTHER PUBLICATIONS

Adams et al, RFC 3161 (2001).*
Lumineau et al., Sharing communities experiences for query propagation in peer-to-peer systems, Jul. 7-9, 2004, IEEE, 246-253.*
Yeung et al., A multi-agent approach to immediate view maintenance for an operational data store, Jul. 25-28, 2001, IEEE 1869-1874.*

* cited by examiner

*Primary Examiner*—Jean B Fleurantin
(74) *Attorney, Agent, or Firm*—Fay Kaplun & Marcin, LLP

(57) ABSTRACT

A method for propagating changes, including updates and new configurations, to data in a data-store for a network is disclosed. The methodology discovers a method that includes forming a schedule for each one of a group of intelligent peripheral resources and forming a query to a data-store for each one of the intelligent peripheral resources. The method continues by using each one of the group of intelligent peripheral resources to gather new data, which is the result of the query, and updating the data with the gathered new data so the updated data can be stored on a computer readable media.

12 Claims, 1 Drawing Sheet

METHOD FOR DISTRIBUTED CONFIGURATION AND FILE DISTRIBUTION BASED ON CENTRALIZED DATA

CROSS REFERENCE TO RELATED APPLICATIONS

The present application claims priority to U.S. Provisional Patent Application Ser. No. 60/623,897 filed on Nov. 1, 2004.

FIELD

The present embodiments relate generally to a method of updating network peripherals by having the peripherals contact other network peripherals to see if there are any updates available.

BACKGROUND

Many products or services have a need to configure numerous computers with configuration settings or files; however, these users do not want to perform updates as many times as they have servers or in direct correlation to their number of network servers. The present methods allow updating to be performed once, but configuration and distribution can be performed dynamically to all servers. Anyone who runs a web-hosting service, network, or the like can experience this problem. For example, a user can imagine upgrading graphics for their web-site, which is hosted on ten servers or defining certain interface policies that apply to all interfaces in a network.

Thus, a need exists for a software process that can be run on each server which requires an updating or needs to be configured. Each server has one or more roles that are defined for the server in a central data-store that can be read by the software process. Based on the role(s) of the server the software process is running on, defined tasks can be performed by reading a central data-store and populating the proper parts of the server.

The present embodiments meet these needs.

SUMMARY

An embodiment of the method can be for propagating changes to data in a data-store for a network. The steps of the method can be forming a schedule for each one of a group of intelligent peripheral resources or each one of the intelligent peripherals can register to be notified of the need to query or update. Another step in the method can be forming a query to a data-store for each one of the intelligent peripheral resources. A third step in the method can be using each one of the group of intelligent peripheral resources to gather new data which is the result of the query. The last step in the method can be updating the data with the new data and storing the update on computer readable media. The media can be accessible by a member of the group consisting of: at least one of the groups of intelligent peripheral resources, an end user, or combinations thereof.

New data can be pulled in on a schedule by the intelligent peripheral resources. The schedule can comprise a fixed interval of time, a start-up, a shut-down, an externally generated event, and combinations thereof.

The intelligent peripherals can be notified that a registered event has occurred.

The data-store can be the only resource in the network that is updated by a user. The user can be a person, a business, a computer, or another group of intelligent peripheral resources. The intelligent peripheral resources can then contact the data-store to receive updates.

BRIEF DESCRIPTION OF THE DRAWINGS

The detailed description will be better understood in conjunction with the accompanying drawings as follows.

Figure 1:
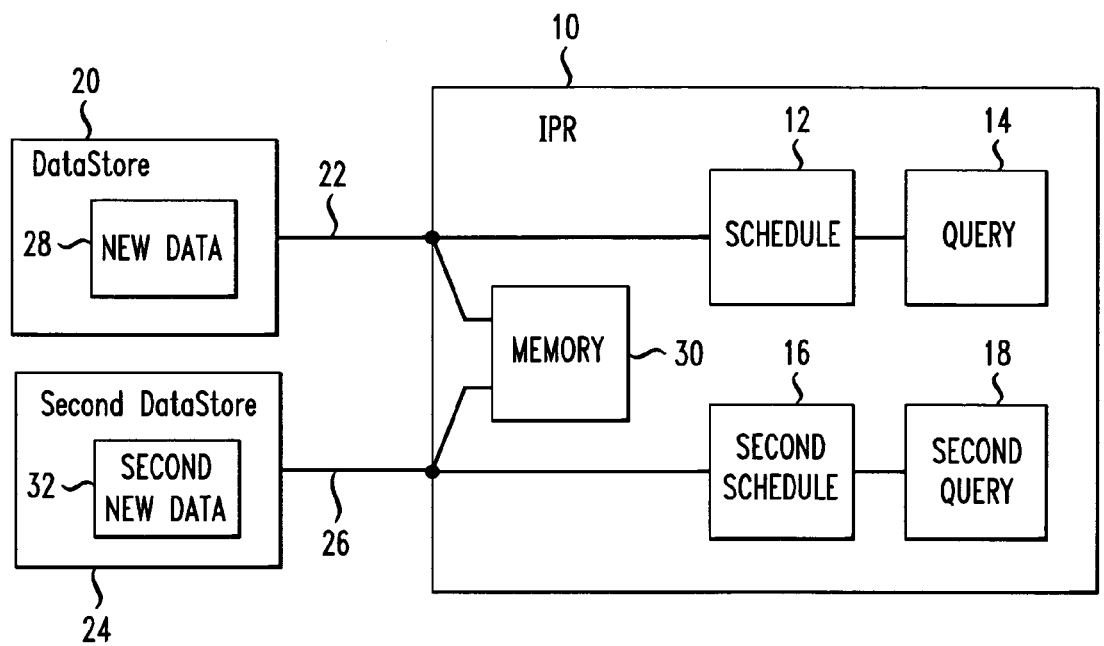
FIG. 1 depicts an example of an embodiment of a method for propagating changes to data in a data-store for a network.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The embodiments are for a method of updating network intelligent peripheral resources by having the intelligent peripherals contact other network intelligent peripherals to see if there are any updates available.

The embodiments of the method can be used to improve performance of the intelligent peripheral resources. The method can be used to reduce space needs of the intelligent peripheral resources. Accordingly, a benefit of this embodiment can be having a software process, that can be run on each intelligent peripheral resource (IPR) needing to be configured or updated, so the IPR does not have to wait for an update to be sent from an outside source.

An embodiment of the method can be for propagating changes to data in a data-store for a network. The initial step of the method can be forming a schedule for each one of a group of intelligent peripheral resources or each one of the intelligent peripherals can register to be notified of the need to query or update. The present embodiments contemplate that the initial step can vary. For example, a schedule can be made to determine when the intelligent peripheral resources do their thing. Alternatively, each IPR can register for notifications based on interests and, when such a notification occurs, the IPR can take an action. This notification corresponds to the "externally generated event" mentioned in paragraph.

Another step in the method can be forming a query to a data-store for each one of the intelligent peripheral resources. A third step in the method can be using each one of the group of intelligent peripheral resources to gather new data, which is the result of the query. A final step in the method can be updating the data with the new data and storing the update on computer readable media. The media can be accessible by a member of the group consisting of: at least one of the groups of intelligent peripheral resources, an end user, or combinations thereof.

New data can be pulled in on a schedule by the intelligent peripheral resource. The schedule can be setup so that updating occurs when the intelligent peripheral resource is not being used, such as when a business is closed. The schedule can comprise a fixed interval of time, a start-up, a shut-down, an externally generated event, and combinations thereof. The external event can be a signal from a remote source that an update needs to occur.

If the step of updating the data with the new data fails, the intelligent peripheral resource can continue to use the prior version of the data; the intelligent peripheral resource device can try the update again, immediately; the intelligent peripheral resource device can delay the retry of the update until another update is scheduled; the intelligent peripheral resource device can have the sections dependant on that particular data go offline; or the entire intelligent peripheral resource device can go offline.

The intelligent peripheral device can also send a signal indicating that the update has failed. The signal can be sent to the data-store, the operator of the data-store, the operator of the intelligent peripheral resource device or another interested party.

The data-store can be the only resource in the network that is updated by a user. The user can be a person, a business, a computer, or another group of intelligent peripheral resources. The intelligent peripheral resources can then contact the data-store to receive updates or can receive notification that the update or notification that an event has occurred The methods can further comprise the step of forming a second query after data is gathered as a result of the query. There can also be multiple simultaneous queries, to a single data-store or to multiple data-stores.

The network can comprise the group of intelligent peripheral resources communicating with a group of data-stores.

The intelligent peripheral resource can be a server, a personal computer, a personal digital assistant, a cell phone, a land phone, another client device, or any electronic device that can be updated, or combinations thereof.

The method can be performed to update a web-server, a report server, a phone book, an address book, a calendar, email data, a configuration for an intelligent peripheral resource, a logic operating on the intelligent peripheral, or any set of computer instructions. As an example, the methods can be used to populate another data-store when data changed in the first data-store. As an example, data about a customer configuration can be read and then the data store of a switch can be populated to apply the customer configuration to incoming calls The method can comprise a query to obtain a portion of the contents of the data-store that has changed since a previous query was made to the data-store. This query can be repeated using a schedule.

The method can further comprise the step of making a second query of the results of the query to obtain a subset of the data-store. This query can comprise a query to obtain all the contents of the data-store.

The data-store can be a directory, a file system, a relational database, an object oriented database, or combinations thereof. The data store can be memory, as in an in-memory data store. The data-store can be stored on a single server or a group of linked servers. The server can be a computer, a disc array, memory, shared memory segments, and combinations thereof.

The gathered data can be stored in memory of an intelligent peripheral resource or any computer readable media accessible by the intelligent peripheral resource.

Another embodiment can be for a method of detecting changes to data in a data-store for a network. The schedule can be an event-driver to cause an event to trigger the method for propagating changes to the data in a data-store for a network. The IPR can register for the events that the IPR is interested in accordance to the role or roles the IPR was assigned. The schedule based query idea, the event registration, and notification idea are all aspects of the methods either individually or in combination.

The schedule and the event driver can be considered the same entity or different aspects depending upon the use. The schedule, in one sense, can relate to a time-based entity that is fairly rigid at any instant in time. The event-driven system can be considered more dynamic, wherein an IPR can say "I want a notification when data X changes" and the notification comes any time that data is update.

With reference to the figures, FIG. 1 depicts an embodiment of the method. The intelligent peripheral resource (IPR) 10, has a schedule 12 and a query 14 attached to schedule 12. The IPR 10 has a second schedule 16 and a second query 18 attached to the second schedule 12. A data-store 20 can be connected to the IPR through a network connection 22. A second data-store 24 can be connected to the IPR through a second network connection 26. When the schedule 12 tells the IPR 10 to send the query 14, the data-store 20 can receive the query 14 and allow the IPR 10 to download the new data 28 from the data-store 20. The new data 28 can then be stored on memory 30 accessible by the IPR 10. When the second schedule 16 tells the IPR 10 to send the second query 18, the second query can be sent to the data-store 20 or the second data-store 24 depending on which data-store the second new data 32 resides. The IPR can be connected to an unlimited number of data-stores and can include multiple schedules and queries. In any combination, a one-to-one correlation may not exist between schedule and query and data store. For example, a schedule can involve multiple different initial queries and all of the queries can hit the same data store. Multiple IPRs can be attached to each data-store.

While these embodiments have been described with emphasis on the embodiments, it should be understood that within the scope of the appended claims, the embodiments might be practiced other than as specifically described herein.

What is claimed is:

1. A data-store storing a set of computer instruction executable by at least one intelligent peripheral resource the set of computer instructions propagating changes to data in a data-store for a network, comprising:
   a. forming a schedule for each one of a group of the at least one intelligent peripheral resources;
   b. forming a query to the data-store for each intelligent peripheral resource, the query requesting a portion of the contents of the data-store that changed since a previous query was made to the data store;
   c. gathering new data using each one of the group of intelligent peripheral resources; and wherein each intelligent peripheral resource communicates with a group of data-stores; and
   d. updating the data-store with the new data and storing the updated data-store and the new data on a computer readable memory media.

2. The data-store of claim 1, wherein the computer readable memory media is accessible by a member of the group consisting of at least one of the group of intelligent peripheral resources, an end user, and combinations thereof.

3. The data-store of claim 1, wherein the schedule comprises a member selected from the group consisting of a fixed interval of time, a start-up, a shut-down, an externally generated event, and combinations thereof.

4. The data-store of claim 1, wherein the group of intelligent peripheral resources comprises a member selected from the group consisting of servers, personal digital assistants, cell phones, land phones, other client devices, and linked combinations thereof.

5. The data-store of claim 1, wherein the group of intelligent peripheral resources comprises a member selected from the group consisting of web servers, report servers, phone books, address books, calendars, email data, configurations for each intelligent peripheral resource, logic operating on each intelligent peripheral, computer instructions disposed on the computer readable medium, and combinations thereof.

6. The data-store of claim 1, further comprising the step of forming a second query after new data is generated as a result of the query.

7. The data-store of claim 1, further comprising the step of making a second query to the results of the query to obtain a subset of the data-store.

8. The data-store of claim 1, wherein the query uses a date stamp, a time stamp, or combinations thereof with the schedule.

9. The data-store of claim 1, wherein the data-store is a directory, a memory, a file system, a relational database, an object oriented database, or combinations thereof.

10. The data-store of claim 1, wherein the data-store is located on a single server or a group of linked servers.

11. The data-store of claim 10, wherein the server comprises a member selected from the group consisting of a computer, a disc array, a memory, shared memory segments, and combinations thereof.

12. The data-store of claim 1, wherein the set of computer instructions further include:

detecting changes to data in the data-store for a network, wherein the schedule is an event-driver to cause an event to trigger execution of the set of computer instructions.

* * * * *